US011913824B2

(12) United States Patent
Suemichi et al.

(10) Patent No.: US 11,913,824 B2
(45) Date of Patent: Feb. 27, 2024

(54) COMBINATION WEIGHING DEVICE

(71) Applicant: Yamato Scale Co., Ltd., Hyogo (JP)

(72) Inventors: Ryo Suemichi, Hyogo (JP); Naho Uno, Hyogo (JP)

(73) Assignee: Yamato Scale Co., Ltd., Hyogo (JP)

( * ) Notice: Subject to any disclaimer, the term of this patent is extended or adjusted under 35 U.S.C. 154(b) by 468 days.

(21) Appl. No.: 17/286,398

(22) PCT Filed: Dec. 17, 2019

(86) PCT No.: PCT/JP2019/049359
§ 371 (c)(1),
(2) Date: Apr. 16, 2021

(87) PCT Pub. No.: WO2020/129966
PCT Pub. Date: Jun. 25, 2020

(65) Prior Publication Data
US 2021/0389169 A1 Dec. 16, 2021

(30) Foreign Application Priority Data
Dec. 20, 2018 (JP) .................. 2018-238257

(51) Int. Cl.
*G01G 19/387* (2006.01)
*G01G 21/22* (2006.01)
(52) U.S. Cl.
CPC .......... *G01G 19/387* (2013.01); *G01G 21/22* (2013.01)
(58) Field of Classification Search
CPC ..... G01G 19/387; G01G 21/22; G01G 19/393
USPC .......................................... 177/59
See application file for complete search history.

(56) References Cited

U.S. PATENT DOCUMENTS

| 4,398,614 | A | | 8/1983 | Kakita et al. | |
|---|---|---|---|---|---|
| 4,874,048 | A | * | 10/1989 | Kawanishi | G01G 13/024 177/25.18 |
| 5,646,374 | A | * | 7/1997 | Stapp | G01G 19/393 198/771 |
| 6,825,424 | B2 | * | 11/2004 | Yonetsu | G01G 19/393 177/25.18 |
| 7,368,670 | B2 | * | 5/2008 | Hjalmarsson | G01G 19/393 222/77 |
| 7,572,986 | B2 | * | 8/2009 | Kawanishi | G01G 19/393 177/25.18 |
| 7,790,990 | B2 | * | 9/2010 | Kieselhorst | G01G 19/393 177/25.18 |

(Continued)

FOREIGN PATENT DOCUMENTS

JP 2-016455 B2 4/1990
JP 2-017300 Y2 5/1990
(Continued)

*Primary Examiner* — Jacques M Saint Surin
(74) *Attorney, Agent, or Firm* — Norris McLaughlin, P.A.

(57) ABSTRACT

A combination weighing device is provided that discharges, from a hopper, an article oversupplied into and received by the hopper and that collects the article using the collection container. The combination weighing device includes an oversupplied article retainer disposed at a position on a discharge path for the article to be discharged from the hopper and collected by the collection container. The oversupplied article retainer has a collection chute and a blocking shutters and temporarily retains the article guided to flow downward using the collection chute and the blocking shutter.

7 Claims, 10 Drawing Sheets

Front-back direction

(56) References Cited

U.S. PATENT DOCUMENTS

| | | | | |
|---|---|---|---|---|
| 7,952,036 B2 * | 5/2011 | Kieselhorst | .......... | G01G 19/393 |
| | | | | 177/25.18 |
| 9,459,133 B2 * | 10/2016 | Nagai | .................. | G01G 19/393 |
| 11,248,948 B2 * | 2/2022 | Kawanishi | ........... | G01G 19/393 |
| 2010/0108405 A1 * | 5/2010 | Kieselhorst | .......... | G01G 19/393 |
| | | | | 177/25.18 |

FOREIGN PATENT DOCUMENTS

| | | | |
|---|---|---|---|
| JP | 2018-077075 A | 5/2018 | |
| WO | WO-2017159497 A1 * | 9/2017 | ........... G01G 19/387 |

\* cited by examiner

Front-back direction

Front-back direction

Lateral direction

Lateral direction ent invention comprising: a hopper; and an oversupplied article retainer,
COMBINATION WEIGHING DEVICE

TECHNICAL FIELD

The present invention relates to a combination weighing device for use in mixing and weighing predetermined quantities of different kinds of articles, for example, foodstuffs, snacks and sweets.

BACKGROUND ART

Conventionally, combination weighing devices may be required to combine and weigh a broad range of articles in a predetermined quantity at a time. In some of the known combination weighing devices, an example of which is described in patent document 1, the articles, if oversupplied into a weighing hopper beyond an optimal range of weights, may be discharged onto a reject path provided separately from normal transport paths and then collected into a collection container.

CITATIONS LIST

Patent Document

Patent Document 1: Japanese Unexamined Patent Publication No. 2018-77075

SUMMARY OF INVENTION

Technical Problems

When the collection container is filled with the articles thus oversupplied and then collected, the collection container may have to be moved from a set position and then replaced with an empty collection container or the collection container may have to be returned to the set position after the collected articles are removed from this container. In case such articles happen to be discharged from the combination weighing device during the replacement or other handling of the collection container, the discharged articles may fail to be received and collected by the collection container and drop to anywhere around the set position.

To avoid that, the combination weighing device could optionally be temporarily suspended from operating until the collection container is moved from the set position and replaced with an empty collection container, or until the collection container is moved from the set position for removal of articles supplied in excess and returned to the set position. Such a temporary operational suspension, however, may invite lower working ratios and resulting production shortfalls.

The present invention was accomplished to address these issues of the known art and is directed to providing, in a combination weighing device configured to discharge and collect articles, if they are oversupplied, solutions that allow such excess articles to be collected well without accidental drop of the articles or without temporary shutdown of the weighing device.

Technical Solutions

To this end, the present invention provides the following technical features.

1) A combination weighing device according to the present invention comprising: a hopper; and an oversupplied article retainer, the combination weighing device being configured to discharge an excess amount of articles supplied to the hopper and collect the articles in a collection container, the oversupplied article retainer being disposed on a discharge path from the hopper to the collection container and temporarily retaining the articles on the discharge path.

According to the present invention, the combination weighing device operates as described below when the collection container needs to be moved from the set position in order to replace the article-filled collection container with an empty one or to remove the articles from the collection container.

The operation starts with temporary retention; the oversupplied articles are not collected by the collection container but are temporarily retained in the oversupplied article retainer. Then, the collection container is moved and replaced with an empty collection container or the collected articles are removed from the collection container. In case the collection container is moved from the set position during the time when the weighing device is in operation, any excess articles to be collected later are not collected by the collection container but are temporarily retained in the oversupplied article retainer. This may prevent the articles from accidentally dropping out of the container. The temporary retention of the articles by the oversupplied article retainer may be lifted after the collection container is moved and replaced with an empty one or returned to the set position after the collected articles are removed from this container.

2) According to a preferred embodiment of the present invention, the combination weighing device may be characterized in that the hopper is a weighing hopper that weighs and discharges the article, and the oversupplied article retainer includes a collection chute that guides the article discharged from the weighing hopper into the collection container, and a blocking shutter that opens and closes the discharge path in the collection chute.

According to this embodiment, the blocking shutter is acted upon the collection chute constituting the discharge path through which the oversupplied articles is dischargeable, so that the discharge path is openable and closable. Thus, the articles, if oversupplied, may be selectively let through the discharge path or otherwise temporarily retained.

3) According to another embodiment of the present invention, the combination weighing device may be characterized in that the blocking shutter is allowed to linearly move between a discharge path opening position away from the collection chute and a discharge path closing position proximate to the collection chute.

According to this embodiment, the discharge path may be easily opened and closed through simple linear movements of the blocking shutter toward and away from the collection chute, which may allow the oversupplied article retainer to be structurally simplified.

4) According to yet another embodiment of the present invention, the combination weighing device may be characterized in that the oversupplied article retainer includes: a plurality of the collection chutes arranged next to each other; and a plurality of the blocking shutters disposed correspondingly to the plurality of the collection chutes, and the plurality of the blocking shutters are allowed to linearly move all together.

According to this embodiment, two or more blocking shutters may be integrally formed and accordingly simply structured as compared to the case of the blocking shutters being each disposed discretely for a respective one of the collection chutes. All of the blocking shutter are closed at once, which necessitates the article retention for any collection chutes not requiring the article retention, i.e., not requiring the article removal. This, however, may only means that the oversupplied articles are not immediately collected into the collection container, which may pause no particular risk in the collection of articles per se.

5) According to yet another embodiment of the present invention, the combination weighing device may include: a plurality of the weighing hoppers that discharge the articles oversupplied into the plurality of the collection chutes, the plurality of the weighing hoppers being arranged next to each other; and a plurality of linear feeders that supply the plurality of the weighing hoppers with the articles, the plurality of linear feeders being arranged next to each other.

According to this embodiment, the weighing hoppers that weigh the supplied articles are arranged next to each other, and the linear feeders that supply these weighing hoppers with the articles are also arranged next to each other. In case an operator wants to use a greater number of weighing hoppers when, for example, a broader range of articles need to be supplied to and weighed by the weighing hoppers, the linear feeders and the weighing hoppers respectively arranged next to each other may be simply increased in the directions of their arrangement. The combination weighing device thus structured may be allowed to have a relatively flat and compact structure.

6) According to a preferred embodiment of the present invention, the combination weighing device may further include a movable table on which the collection container is placeable, the movable table being allowed to slide by manual handling.

According to this embodiment, simple sliding movements of the movable table may allow the collection container to be easily moved away from the set position or to be easily moved back to the set position.

7) According to a preferred embodiment of the present invention, the combination weighing device may further include a plurality of mirrors disposed in a manner that inside of the collection container is externally viewable.

This this embodiment may allow an operator to easily check the collection container located at the set position out of sight, for example, whether the articles are retained or how many articles are currently retained therein.

Effects of the Invention

In the combination weighing device according to the present invention configured to discharge the articles, if oversupplied, and collect them into the collection container, such articles may be successfully removed from the collection container and collected without accidental drop of the articles or without temporary shutdown of the weighing device.

DESCRIPTION OF EMBODIMENTS

Embodiments of the present invention are hereinafter described in detail with reference to the accompanying drawings.

Figure 1:
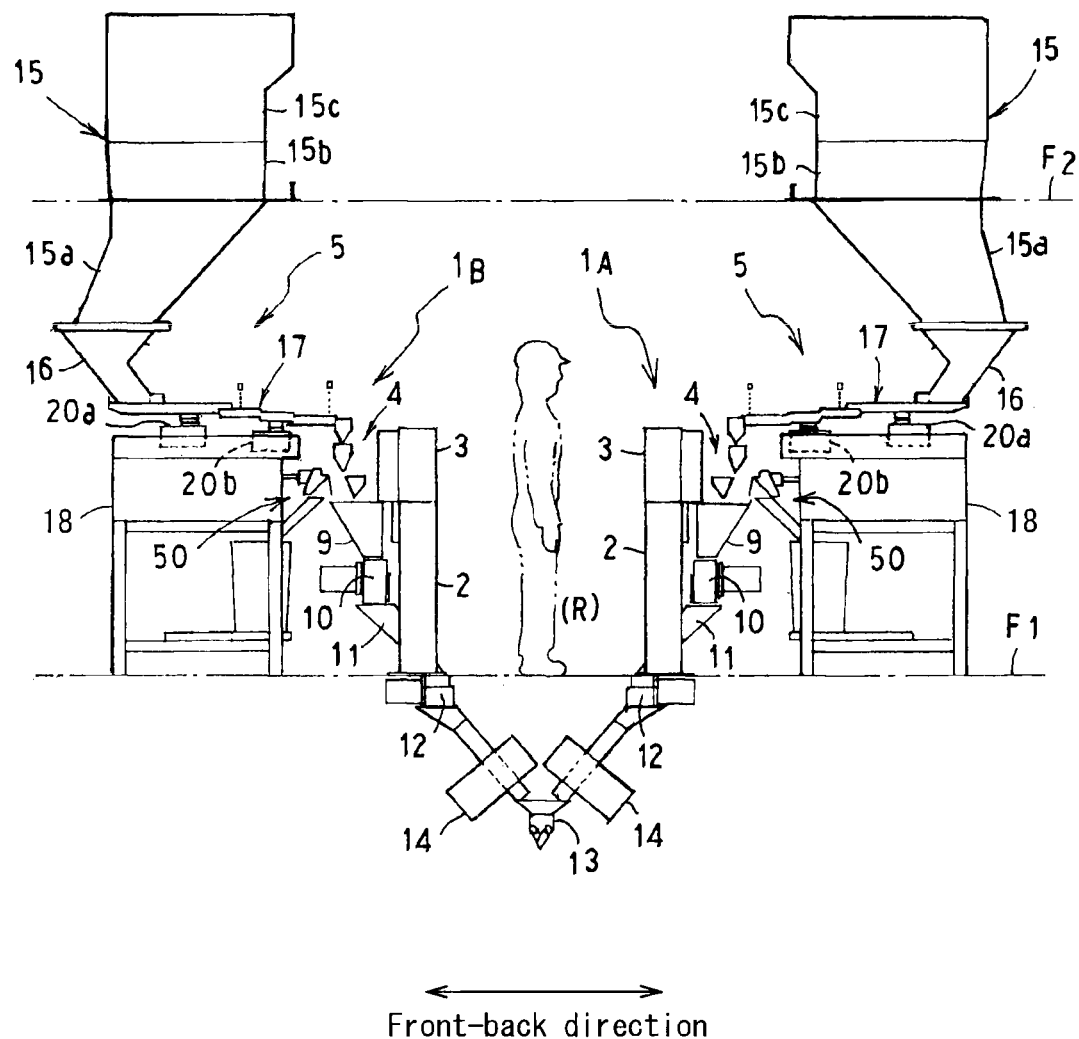
FIG. 1 is a schematic side view of a combination weighing device according to an embodiment of the present invention.
Figure 2:
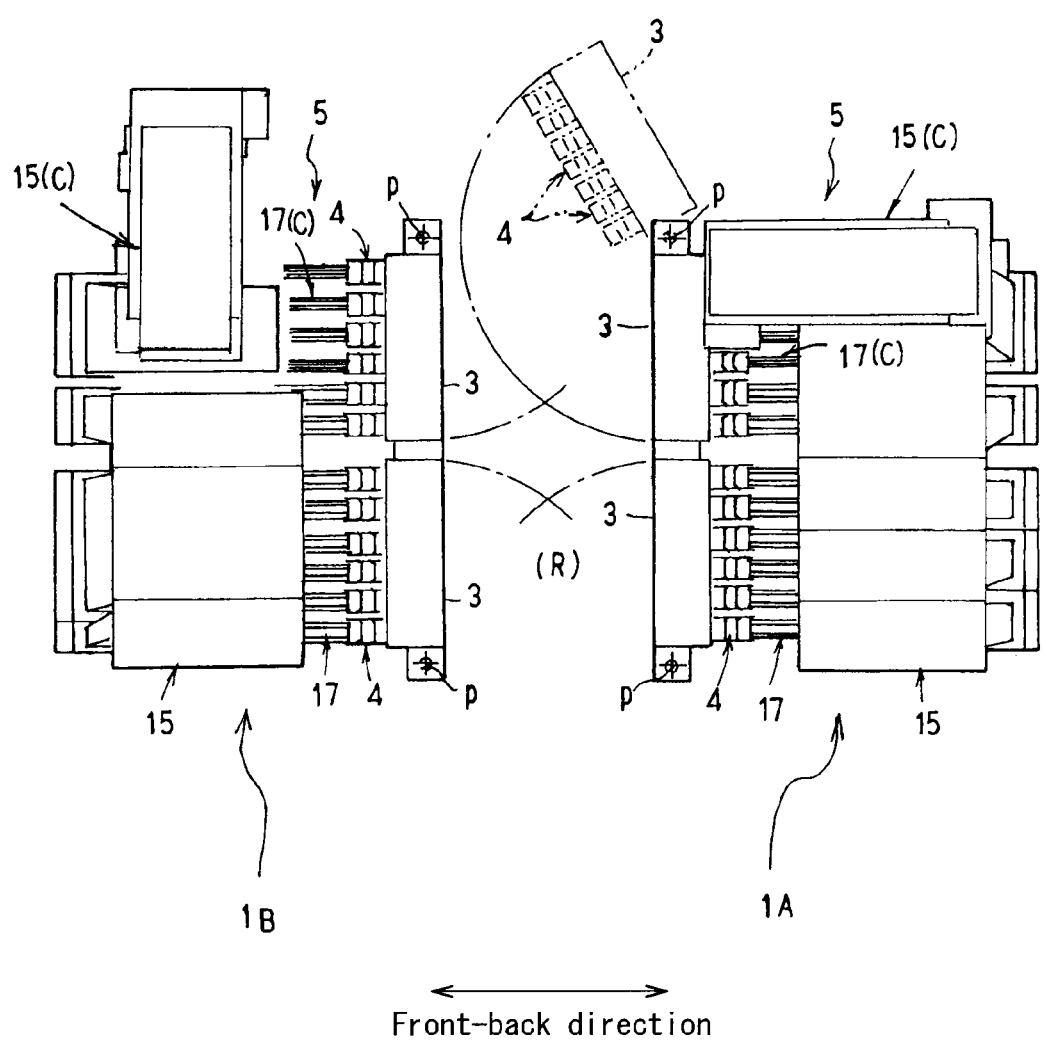
FIG. 2 is a schematic plan view of the combination weighing device illustrated in FIG. 1.
Figure 3:
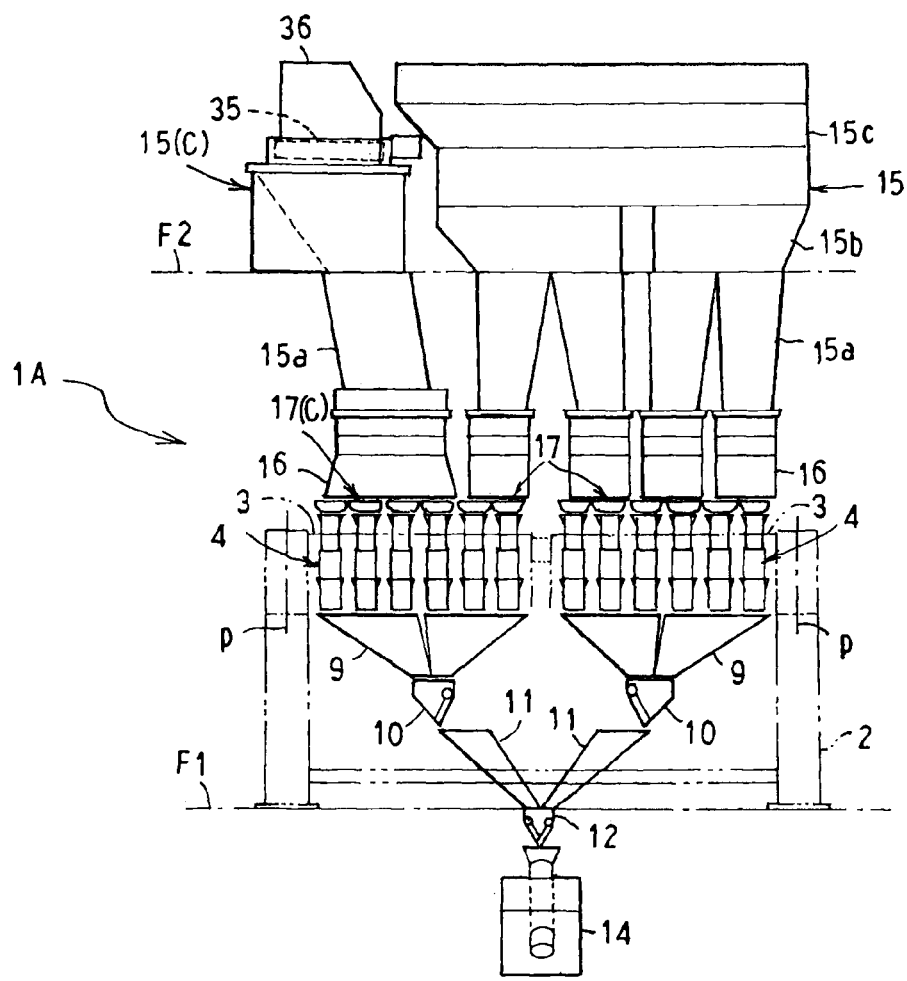
FIG. 3 is a schematic front view of one of weighing devices illustrated in FIG. 1.
Figure 4:
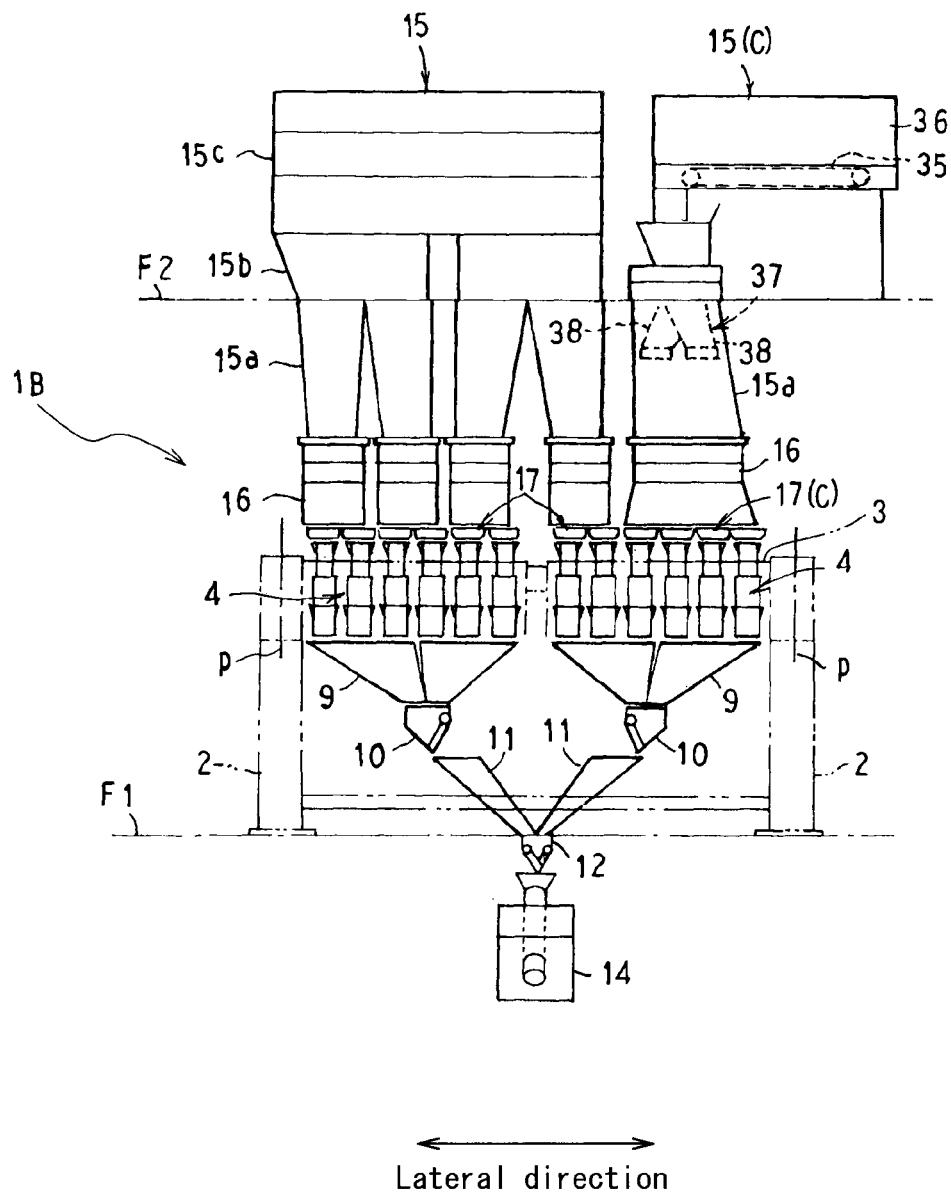
FIG. 4 is a schematic front view of the other weighing device illustrated in FIG. 1.

FIG. 1 is a schematic side view of a combination weighing device according to an embodiment of the present invention. FIG. 2 is a schematic plan view of the combination weighing device. FIGS. 3 and 4 are schematic front views of weighing devices.

The combination weighing device according to this embodiment is for use in mixing and weighing predetermined quantities of articles that range in a wide variety (for example, eight kinds of articles) such as foodstuffs including snacks and sweets.

This combination weighing device is installed on a first floor surface F1 for use in a packaging line, in which weighed articles are thrown in and packed into bags in a packaging apparatus, not illustrated in the drawing, located on a lower level than the floor surface.

For readability of this specification to better understand the structural features of this combination weighing device, a front-back direction is hereinafter used to refer to the transverse direction on the drawings of FIGS. 1 and 2, and the direction from the near to far side on the drawings of FIGS. 3 and 4. Further, a lateral direction is hereinafter used to refer to the direction from the near to far side on the drawing of FIG. 1, and the transverse direction on the drawings of FIGS. 3 and 4.

As illustrated in FIG. 1, the combination weighing device includes a pair of weighing devices 1A and 1B. These weighing devices 1A and 1B are disposed on the front and back sides in a manner that they face each other, with a central passage R being interposed therebetween. An operator of these weighing devices is allowed to move laterally, from right to left and vice versa, through this central passage R. The weighing devices 1A and 1B are essentially configured likewise, structural features of which are hereinafter described.

On the inner sides of the weighing devices 1A and 1B (on the sides of the central passage R), two bases 3 are each disposed on a support frame 2 vertically disposed on the first floor surface F1 and thereby stands to a predetermined height. The bases 3 are disposed so as to extend in the lateral direction. On the outer sides of the bases 3 (on the sides opposite to the central passage R), multiple weighing units 4 are disposed in a row in the lateral direction. In the illustrated example, the weighing devices 1A and 1B are each equipped with 12 weighing units 4 that are lined up in a row. A wide variety of articles may be successfully mixed and weighed with these 24 weighing units 4, in total, of the weighing devices 1A and 1B.

An article supplier 5 is disposed on the outer side of the weighing units 4. The article supplier 5 supplies various kinds of articles to be weighed to positions above the weighing units 4.

Figure 5:
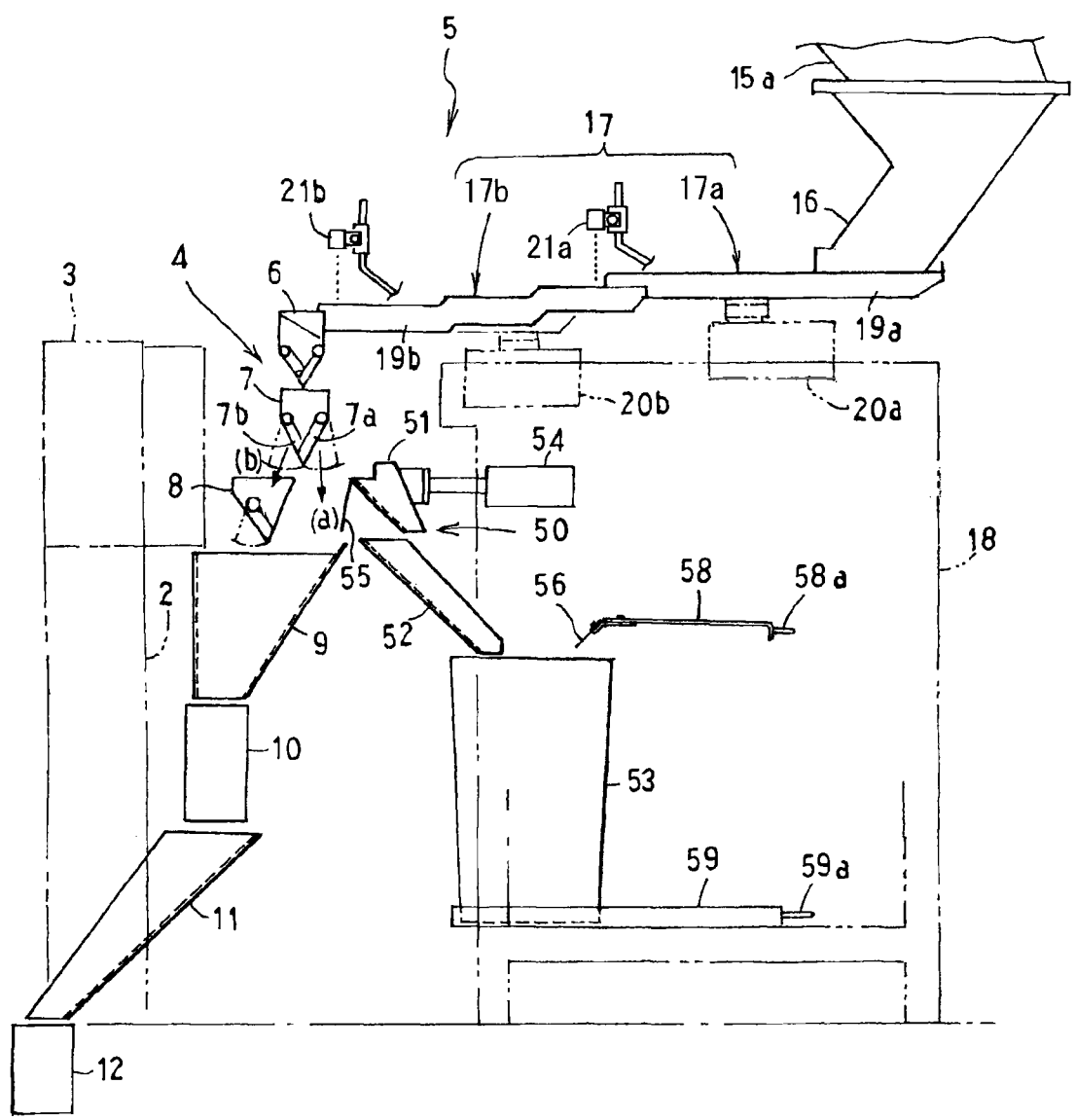
FIG. 5 is a side view of principal components of the weighing device.

As illustrated in FIG. 5, the weighing units 4 are essentially configured as in the known art. The weighing units 4 each include a supply hopper 6, a weighing hopper 7, and a memory hopper 8. These hoppers 6, 7 and 8 are vertically disposed in a row and respectively have gates adapted to open and close. The supply hopper 6 receives articles transported from the article supplier 5 and then temporarily retains and discharges the received articles. The weighing hopper 7 retains the articles discharged from the supply hopper 6 and then weighs and discharges the retained articles. The memory hopper 8 receives the articles weighed by and discharged from the weighing hopper 7 and then temporarily retains and discharges the received articles.

The supply hopper 6, weighing hopper 7, and memory hopper 8 are detachably fitted to the base 3. In the base 3 are housed such devices as a mechanism to open and close the gates of these hoppers and a weight sensor used to measure the weights of the weighing hoppers 6.

As illustrated with a virtual line in FIG. 2, the bases 3 are supported in upper parts of the support frame 2 in a manner that these bases are pivotable around fulcrums "p" vertically extending at lateral ends. When the base 3 is pivoted toward the central passage R around the fulcrum vertically extending at the lateral end to have the weighing units 4 exposed to a large extent, the hoppers and other components may be easily attached and detached to and from the base 3 for maintenance and other purposes.

As illustrated in FIG. 5, the weighing hopper 7 has, at its lower end, an outer gate 7a and an inner gate 7b that are adapted to independently open and close. When the outer gate 7a alone is oscillated to open, the weighed articles are discharged directly into a first collection chute 9 disposed below through a first outgoing path (a). When the inner gate 7b alone is oscillated to open, the weighed articles are discharged into the memory hopper 8 through a second outgoing path (b) and temporarily retained in the memory hopper 8.

The weighing units 4 are each equipped with a memory hopper 8. These memory hoppers 8, as well as the weighing hoppers 7, may be allowed to participate in combinatorial computations. Thus, more hoppers may be available for combinatorial computations (available hoppers).

At positions below the weighing hoppers 7 and the memory hoppers 8, four first collection chutes 9 are disposed in a row in the lateral direction. These first collection chutes 9 collect the articles dropping downward from the weighing hoppers 7 or the memory hoppers 8 determined and selected as having a predetermined combined weight by the combinatorial computations. Two first collection hoppers 10 are each disposed at a position below two adjacent ones of the first collection chutes 9. These first collection hoppers 10 temporarily receive and retain the articles collected by the first collection chutes 9. Second collection chutes 11 are disposed at positions below the first collection hoppers 10. These second collection chutes 11 guide and collect the articles dropping downward from the first collection hoppers 10. In a respective one of the weighing devices 1A and 1B, a second collection hopper 12 is disposed at a position below the second collection chutes 11. In the second collection hopper 12 are gathered together and temporarily retained the articles weighed and collected by the 12 weighing units 4.

As illustrated in FIG. 1, a final collection hopper 13 is disposed at a position down below the central passage R. In the final collection hopper 13 are gathered together the articles discharged from the second collection hoppers 12 of both of the weighing devices 1A and 1B. This final collection hopper 13 is opened and closed in response to a supply request instruction outputted from the packaging apparatus. A metal detector 14 is disposed in a guiding path through which the articles are dropping downward from the second collection hopper 12 into the final collection hopper 13. The metal detector 14 monitors whether the articles are contaminated with any metallic foreign matter.

The article supplier 5 has retaining tanks 15 in which the articles are retainable and further has retaining hoppers 16. The retaining hoppers 16 are continuous to lower ends of the retaining tanks 15. In the article supplier 5, twelve linear feeders 17 are disposed next to each other in the lateral direction at positions above a support table 18. The linear feeders 17 vibrationally transport the articles dropping downward from lower ends of the retaining hoppers 16 into the 12 weighing units 4.

The retaining tanks 15 include a lower-stage tank 15a, a mid-stage tank 15b, and an upper-stage tank 15c. The lower-stage tank 15a is fitted into and supported by the opening of a second floor surface F2 located at a position way above the first floor surface F1. The mid-stage tank 15b is detachably and supportably fitted to an upper part of the lower tank 15a, and the upper-stage tank 15c is attached likewise to an upper part of the mid-stage tank 15b. The retaining hopper 16 is detachably and supportably coupled to a lower end of the lower-stage tank 15a.

As illustrated in FIG. 5, the linear feeder 17 includes an upstream linear feeder 17a and a downstream linear feeder 17, which are respectively disposed on upstream and downstream sides in the direction of transport of articles. The upstream linear feeder 17a and the downstream linear feeder 17b are disposed in tandem, with the upstream linear feeder being located at an upper position than the downstream one, like a stepwise slope directed downward. These linear feeders 17a and 17b respectively have troughs 19a and 19b and vibration generating mechanisms 20a and 20b. The troughs 19a and 19b are shaped in the form of a groove in cross section. The vibration generating mechanisms 20a and 20b are disposed at upper positions of the support table 18. The troughs 19a and 19b are detachably coupled to vibration heads of the vibration generating mechanisms 20a and 20b.

The articles thrown out of the retaining hopper 16 into the upstream linear feeder 17a are vibrationally transported and thereby loosened into pieces, and then flow into the downstream linear feeder 17b. Then, the articles are thrown, in a small quantity at a time, out of the article-outgoing end of the downstream linear feeder 17b into the supply hopper 6 of the weighing unit 4.

Article sensors 21a and 21b are disposed at positions above the linear feeder 17. These article sensors 21a and 21b may detect, using, for example, laser, heights of the articles piled up at the article-incoming end and the article-outgoing end of the downstream linear feeder 17b. The vibration generating mechanisms 20a and 20b are driven to generate vibration based on information of article detection outputted from the article sensors 21a and 21b, so that the linear feeders 17 are each allowed to uniformly transport the articles.

The tanks and feeders described thus far may be standard-spec components used to supply articles that hardly stick together like nuts, bean snacks, and cubic rice crackers. Some of the linear feeders 17 used to transport, in a small quantity at a time, sticky articles like small rice crackers or small fishes cooked in mirin, and retaining tanks 15 used with such linear feeders are configured differently to the standard-spec ones. In the example described below, of the 12 linear feeders 17 arranged next to one another in the lateral direction, four linear feeders 17(C) on one end side in the lateral direction and a retaining tank 15(C) disposed correspondingly to these feeders are configured according to a specification that differs from the standard specification, as illustrated in FIGS. 2 to 4.

The different-spec retaining tank 15(C) is provided with a belt conveyer 35 having a large width. This belt conveyer 35 is used to transport articles that may be difficult to smoothly flow downward under their own weights. The belt conveyer 35 is so disposed that is horizontally pivotable along a lower part of an upper tank 36 having a rectangular cylindrical shape, as illustrated in FIGS. 3 and 4. By driving the belt conveyer 35 to pivot, the articles retained at the bottom of the upper tank 36 may be forced out of the tank and allowed to widely flow downward into the retaining hopper 16 through the lower-stage tank 15a.

In the illustrated example, the retaining tank 15(C) of the weighing device 1A and the retaining tank 15(C) of the weighing device 1B are differently situated and installed. As for the retaining tank 15(C) of the weighing device 1A, the belt conveyer 35 is driven to pivot in the front-back direction parallel to the direction of transport of articles by the linear feeders 17. As for the retaining tanks 15(C) of the weighing device 1B, on the other hand, the belt conveyer 35 is driven to pivot in the lateral direction orthogonal to the direction of transport of articles by the linear feeders 17.

The articles dropped and discharged from the article-outgoing end of the belt conveyer 35 are guided into the retaining hopper 16 through the lower-stage tank 15a. In the retaining tank 15(C) of the weighing device 1B illustrated in FIG. 4, the lower-stage tank 15a is embedded with an article split-and-guide member 37 in order to prevent that the articles widely flowing out of the article-outgoing end of the belt conveyer 35 are transported to an off-center position(s) in the lower-stage tank 15a. The article split-and-guide member 37 has a pair of split funnels 38 that are disposed next to each other in the direction of width of the belt conveyer 35. The articles, which are dropped and discharged widely along the belt width from the article-outgoing end of the belt conveyer 35 to an upper part of the lower-stage tank 15a, are guided by the two split funnels 38 of the article split-and-guide member 37 to flow downward and disperse in the direction in which the four linear feeders 17(C) are arranged.

Figure 6:
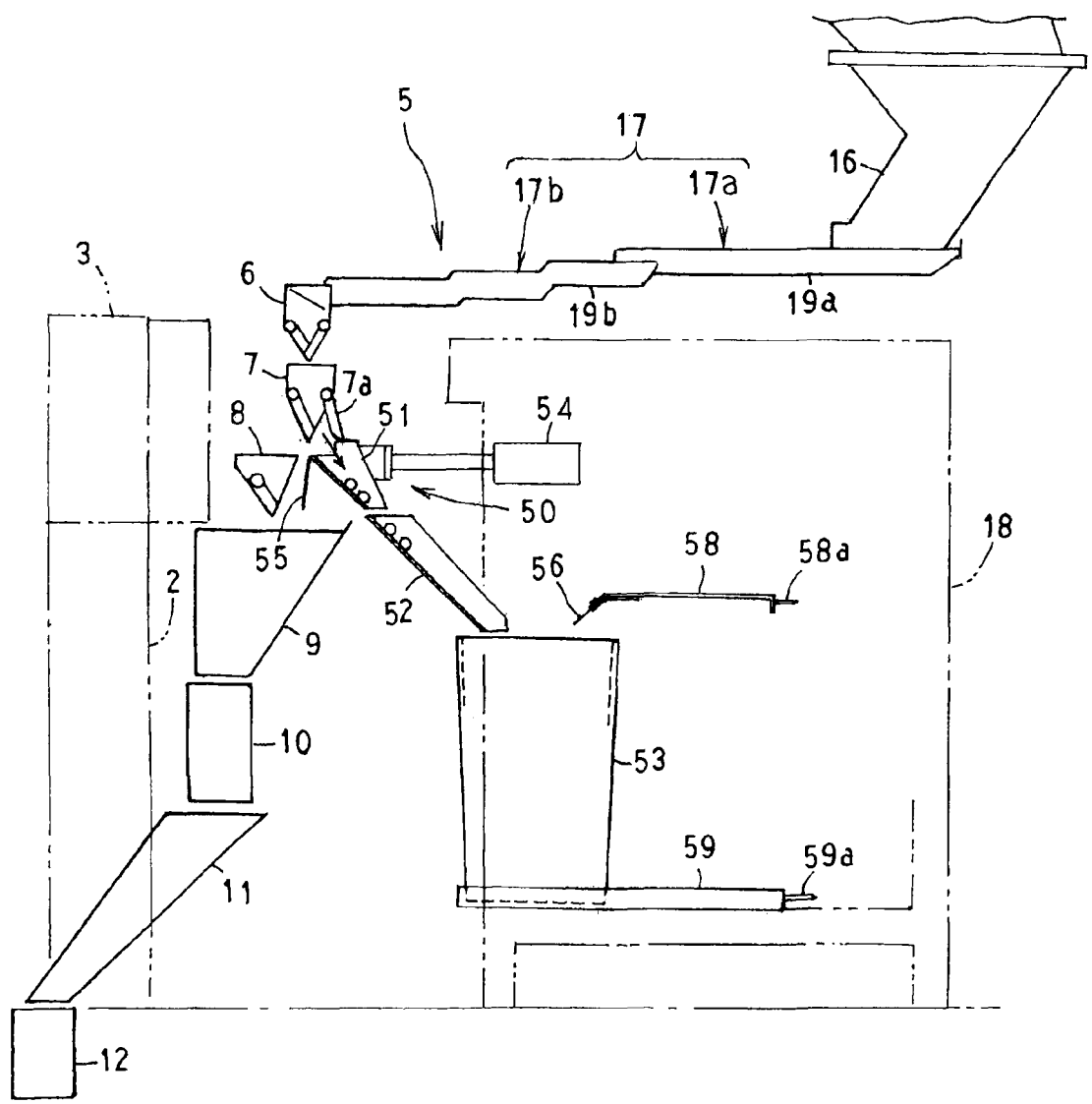
FIG. 6 is a side view of principal components of the weighing device during a REJECT status.
Figure 7:
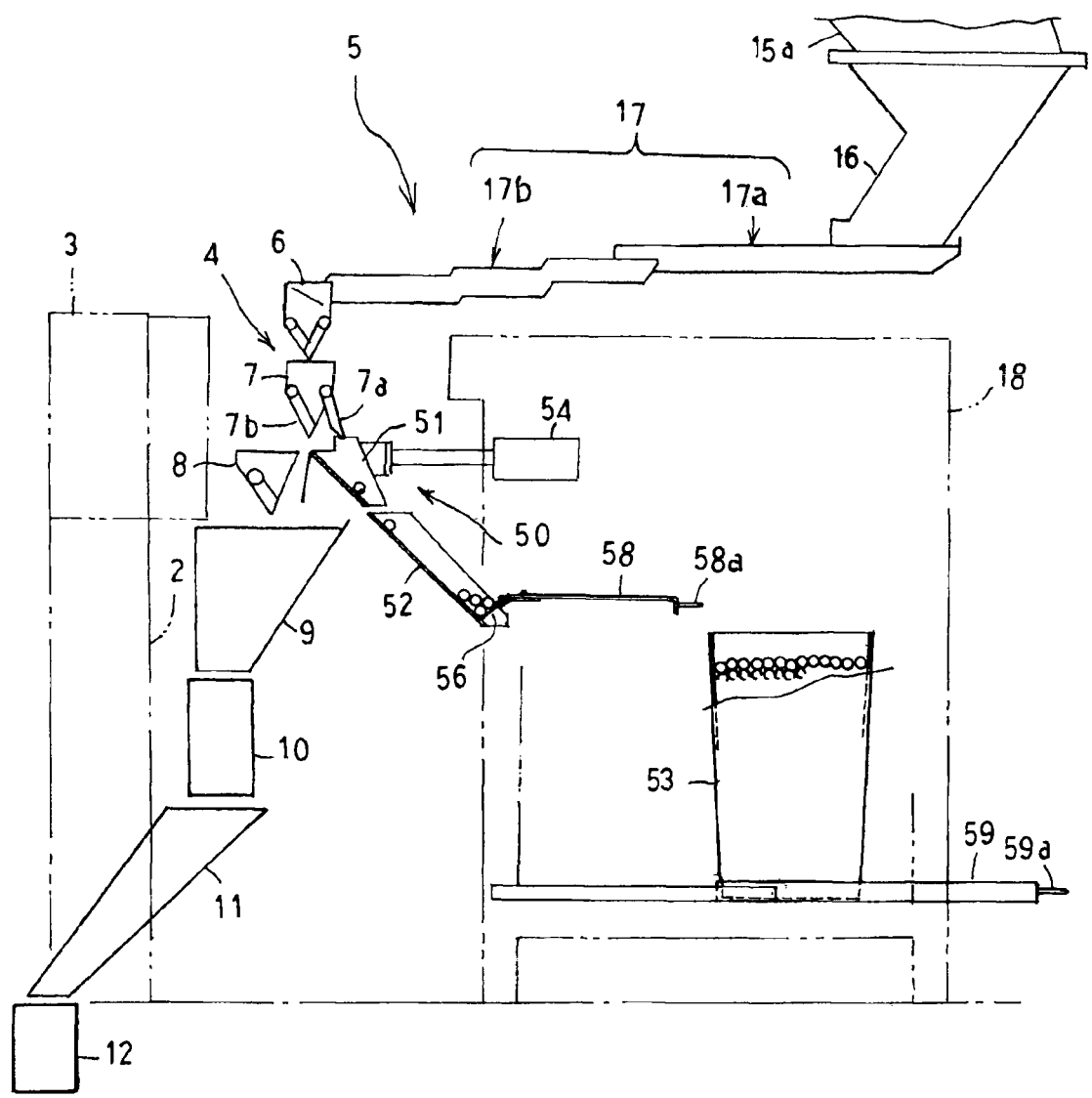
FIG. 7 is a side view illustrating a collection container being removable.

As illustrated in FIGS. 5 to 7, the support table 18 of the article supplier 5 has a reject mechanism 50 disposed to discharge the articles oversupplied into and received by the weighing hopper 6.

The reject mechanism 50 includes a reject chute 51, a collection chute 52 and a collection container 53. The reject chute 51 is allowed to horizontally move forward and backward. The collection chute 52 guides the articles oversupplied and discharged into the reject chute 51 to flow further downward. The collection container 53 is used to retain the articles oversupplied and collected.

The reject chute 51 is disposed so as to face a first transport path (a) of the weighing hopper 7 from the outer front side. The reject chute 51 is driven by an air cylinder 54 to move toward and away from the first transport path (a).

At normal times, the reject chute 51 retreats to and stays at a position on the outer side of the first transport path (a), as illustrated in FIG. 5. Thus, the reject chute 51 may be prevented at normal times from interfering with discharge of the articles into the first collection chute 9 after the outer gate 7a of the weighing hopper 7 is opened.

In case a weight value measured by the weighing hopper 7 suggests an oversupply of the articles beyond a predetermined range of weights, the reject chute 51 moves to and stays on the first transport path (a) as illustrated in FIG. 6, which is REJECT status. When the outer gate 7a of the weighing hopper 7 is opened during the REJECT status, the articles oversupplied into and received by the weighing hopper 7 are discharged into the reject chute 51 and dropped downward into the collection container 53 through the collection chute 52. After the articles are thus collected, the reject chute 51 moves to the original position away from the first transport path (a), and the weighing hopper 7, with the outer gate 7a being closed, is ready for the next combinatorial computations.

The reject chute 51 has, at its edge, a guide member 55 made of a plate material. The guide member 55 is at a position facing the first transport path (a) from the outer side when the reject chute 51 is retreated to and staying at the position on the outer side of the first transport path (a). At this position, the guide member 55 may prevent the articles from flying off outward that are discharged from the weighing hopper 7 when the outer gate 7a is opened, so that the articles are properly guided into the first collection chute 9.

The collection chute 52 is formed in a C-like shape in cross section and has a bottom plate and side plates on its both sides. The collection chute 52 further has, in the vicinity of its exit, a blocking shutter 56. The blocking shutter 56 is allowed to linearly move between a discharge path opening position illustrated in FIGS. 5 and 8 and a discharge path closing position illustrated in FIG. 7. The discharge path opening position is a position distanced from the collection chute 52 constituting a discharge path for the oversupplied articles to be discharged through. The discharge path closing position is a position proximate to and contactable with the collection chute 52. The collection chute 52 and the blocking chute 56 constitute the oversupplied article retainer described herein that temporarily retains the articles oversupplied into and discharged from the weighing hopper 7 before the articles are collected by the collection container 53.

Figure 8:
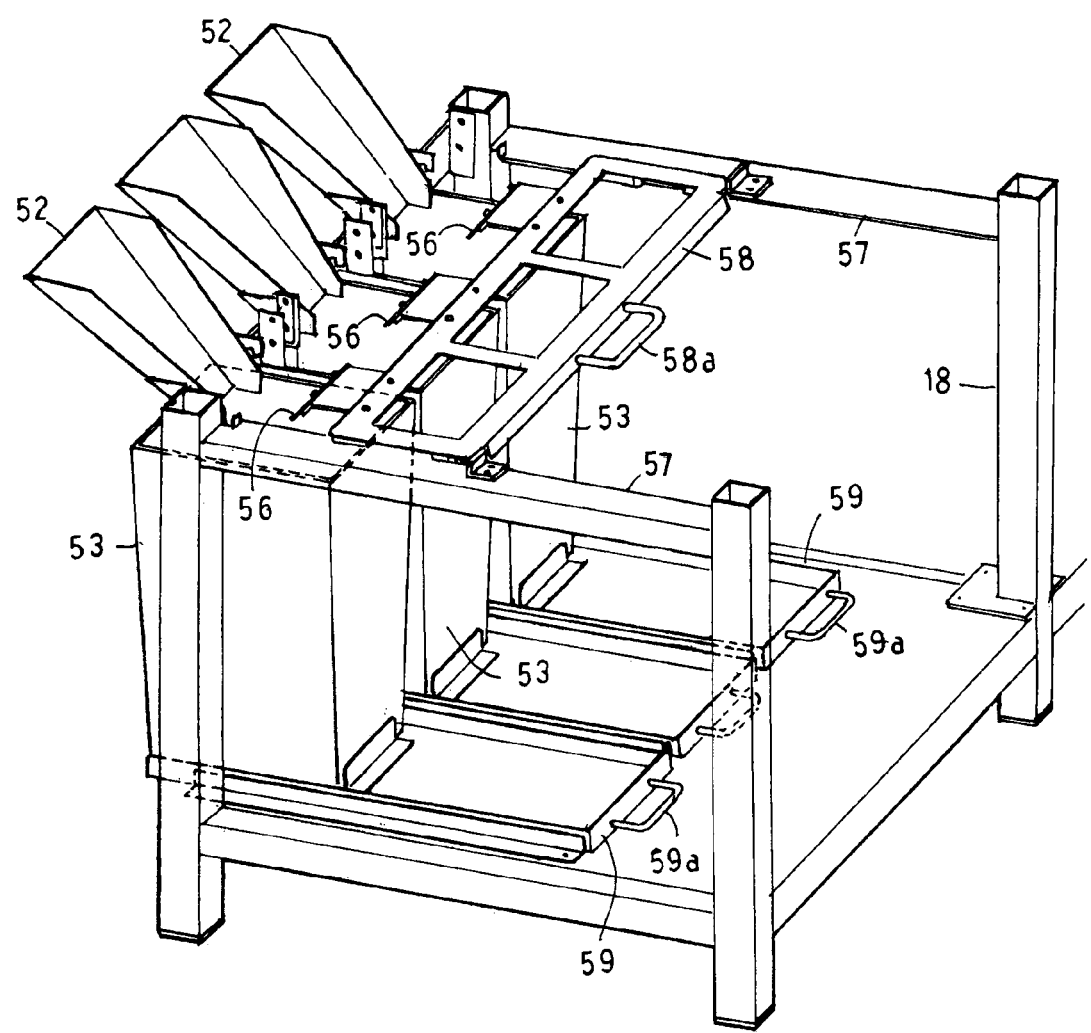
FIG. 8 is a perspective view of an oversupplied article collector.

As illustrated in FIG. 8, the blocking shutter 56 is attached to a movable frame 58 manually slidable forward and backward along a pair of guides 57 disposed on right and left sides of the support table 18. At normal times, the blocking shutter 56 retreats to and stays at the discharge path opening position away from the collection chute 52.

In the illustrated example, three blocking shutters 56 are attached to the movable frame 58 correspondingly to three collection chutes 52 arranged next to one another. These three blocking shutters 56 are linearly moved all together to open and close the collection chutes 52 at once.

When the collection container 53 is fully filled with the articles, the blocking shutters 56 are moved, with a handle 58a disposed at a lower end of the movable frame 58, toward and stay in contact with a lower end of the collection chute 52 to close the discharge path. While the articles are discharged into and are being temporarily retainable in the collection chute 52 after the discharge path is closed, the collection container 53 is removed outward from a predetermined set position.

The collection container 53 emptied after the articles are removed therefrom is put back to the set position, and the blocking shutter 56 is then moved back to its original position to open the discharge path. The oversupplied articles to be discharged are then invited again to flow downward into and collected by the collection container 53. The blocking shutter 56 contacts the collection chute 53 obliquely downward relative to the inclined bottom surface of this chute, thereby closing the discharge path. When the blocking shutter 56 is moved back to its original position to open the discharge path, the articles temporarily retained in the collection chute 53 are, being guided along inclined surfaces of this chute and of the blocking shutter 56, smoothly thrown into and collected by the collection container 53.

The collection container 53 is positionally located at and fitted in the front part of a movable table 59 disposed in a lower part of the support table 18 in a manner that this collection container is allowed to move forward and downward. When the movable table 59 is pulled outward with a handle 59a disposed at a rear end of the movable table 59, a relatively large space may be secured that allows the collection container 53 to be easily removed.

According to this embodiment, when the collection container 53 is fully filled with the articles oversupplied and discharged, the blocking shutter 56 is moved toward and stays in contact with the lower end of the collection chute 52 to close the discharge path. Thus, the oversupplied articles discharged into and collected by the collection chute 52 may be temporarily blocked and retained. Then, the collection container 53 is released from the set position for removal of the articles retained therein, and the emptied collection container 53 is returned to the set position. After that, the blocking shutter 56 is moved away from the collection chute 52 to open the discharge path. The articles oversupplied and collected later may be thus prevented from dropping to undesired positions when the collection container 53 is moved, in which case temporary shutdown of the combination weighing device may be unnecessary.

Other Embodiments

The present invention may be feasible as described below.

Figure 9:
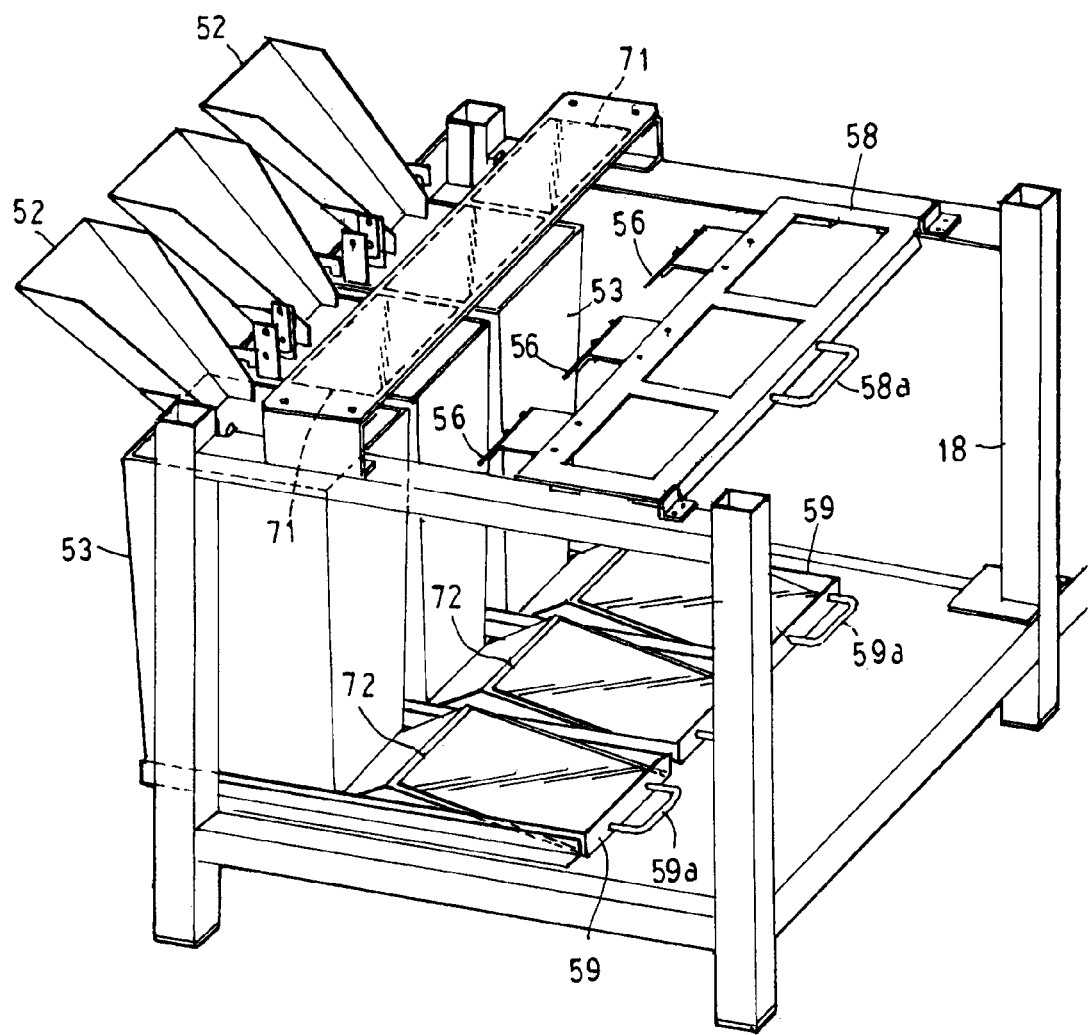
FIG. 9 is a perspective view of an oversupplied article collector according to another embodiment of the present invention.
Figure 10:
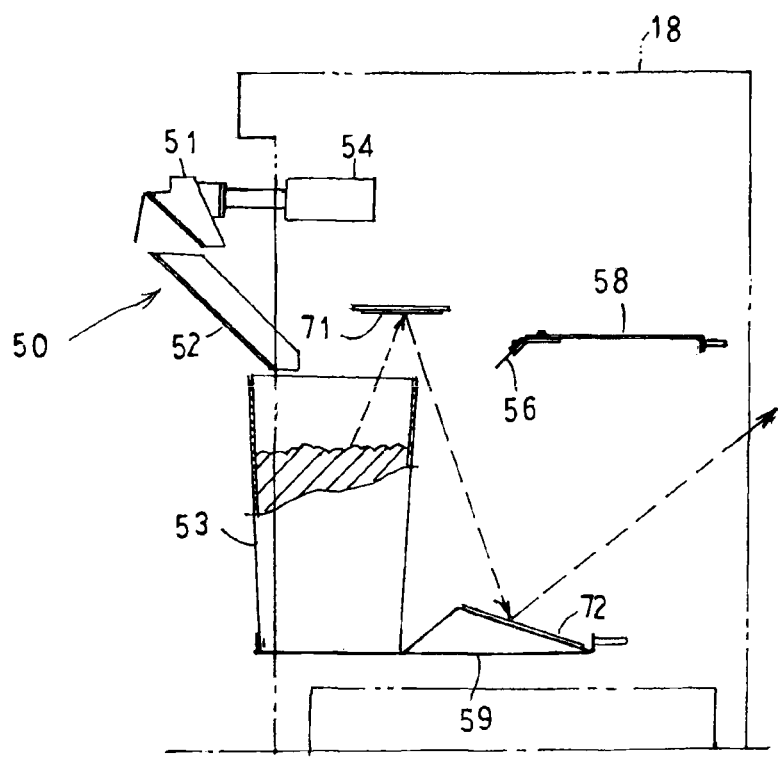
FIG. 10 is a schematic side view of the embodiment of FIG. 9.

1) As illustrated in FIGS. 9 and 10, the combination weighing device may further include mirrors 71 and 72. The mirrors 71 are each directed downward and disposed at a position in the upper direction of the collection container 53. The mirrors 72 are each disposed, with its back side being directed obliquely upward, on the movable table 59 that supports the collection container 53. An operator, looking down in a comfortable position at the collection containers 53 on the inner-back side of the support table 18 from behind and above the article supplier 5, may be able to easily check whether the articles are retained or how many articles are currently retained in these collection containers through reflections in the vertically disposed mirrors 71 and 72.

2) Optionally, an infrared sensor may be disposed at a position in the upper direction of the collection container 53 and used to detect the height of articles piled up in the container, in which case an alarm may be issued that encourages an operator to remove the container when the container is detected as containing a preset quantity of articles. In this instance, an operator may no longer have to frequently check the status of articles being retained or not retained in the collection containers 53.

3) An easier option may be a window attached to the collection container 53 that allows an operator to visually check whether the articles are retained or how many articles are currently retained in the container. This, however, may be unsuitable for any articles likely to soil or damage the window, for example, articles coated with oil, soup, juice, or powder.

4) Optionally, the oversupplied article retainer described herein may include a blocking shutter adapted to oscillate around a horizontal fulcrum extending in the upper direction of the collection chute 52.

5) The collection chute 52 may be replaced with a retaining hopper adapted to open and close. In this instance, the oversupplied article retainer described herein may include the retaining hopper adapted to open during the time when the collection container 53 is set at a predetermined article-collecting position and adapted to temporarily close during the time when the collection container 53 is away from the predetermined position.

6) The combination weighing device may further include a means that detects whether the collection container 53 is currently at the predetermined set position. In this instance, the status of the oversupplied article retainer described herein may be automatically changed based on a result of detection outputted from this means. Specifically, the oversupplied article retainer described herein may leave the discharge path open when the means detects that the collection container 53 is currently at the predetermined set position, whereas the oversupplied article retainer described herein may leave the discharge path closed when the means detects that the collection container 53 is away from the predetermined set position. This may avoid the risk of accidental drop of the articles to be discharged and collected.

REFERENCE SIGNS LIST

4 weighing unit
6 supply hopper
7 weighing hopper
50 reject mechanism
52 collection chute
53 collection container
56 blocking shutter
58 movable frame
59 movable table

The invention claimed is:

1. A combination weighing device, comprising:
   a hopper; and
   an oversupplied article retainer,
   the combination weighing device being configured to discharge an excess amount of articles supplied to the hopper and collect the articles in a collection container,
   the oversupplied article retainer being disposed on a discharge path from the hopper to the collection container and temporarily retaining the articles on the discharge path, wherein
   the hopper is a weighing hopper that weighs and discharges the article, and
   the oversupplied article retainer comprises:
   a collection chute that guides the article discharged from the weighing hopper into the collection container; and
   a blocking shutter that opens and closes the discharge path in the collection chute.

2. The combination weighing device according to claim 1, wherein
   the blocking shutter is allowed to linearly move between a discharge path opening position away from the collection chute and a discharge path closing position proximate to the collection chute.

3. The combination weighing device according to claim 2, wherein
   the oversupplied article retainer comprises:
   a plurality of the collection chutes arranged next to each other; and a plurality of the blocking shutters disposed correspondingly to the plurality of the collection chutes, wherein the plurality of the blocking shutters are allowed to linearly move all together.

4. The combination weighing device according to claim 3, comprising:
- a plurality of the weighing hoppers that discharge the articles oversupplied into the plurality of the collection chutes, the plurality of the weighing hoppers being arranged next to each other; and
- a plurality of linear feeders that supply the plurality of the weighing hoppers with the articles, the plurality of linear feeders being arranged next to each other.

5. The combination weighing device according to one of claims 1 and 2 to 4, further comprising a movable table on which the collection container is placeable, the movable table being allowed to slide by manual handling.

6. The combination weighing device according to claim 5, further comprising a plurality of mirrors disposed in a manner that inside of the collection container is externally viewable.

7. The combination weighing device according to one of claims 1 and 2 to 4, further comprising a plurality of mirrors disposed in a manner that inside of the collection container is externally viewable.

* * * * *